United States Patent
Lahmann et al.

(10) Patent No.: US 12,318,932 B2
(45) Date of Patent: Jun. 3, 2025

(54) SYSTEM, METHOD AND APPARATUS FOR PROVIDING A WORK PLATFORM FOR USE WITH AN UNMANNED AERIAL VEHICLE

(71) Applicant: VALMONT INDUSTRIES, INC., Omaha, NE (US)

(72) Inventors: Jacob Lahmann, Omaha, NE (US); Angela R. Chamberlain, Gretna, NE (US)

(73) Assignee: VALMONT INDUSTRIES, INC., Omaha, NE (US)

( * ) Notice: Subject to any disclaimer, the term of this patent is extended or adjusted under 35 U.S.C. 154(b) by 509 days.

(21) Appl. No.: 17/886,629

(22) Filed: Aug. 12, 2022

(65) Prior Publication Data
US 2023/0058374 A1  Feb. 23, 2023

Related U.S. Application Data

(60) Provisional application No. 63/235,223, filed on Aug. 20, 2021.

(51) Int. Cl.
| | |
|---|---|
| *B25J 9/16* | (2006.01) |
| *B25J 9/00* | (2006.01) |
| *B25J 11/00* | (2006.01) |
| *B64C 39/02* | (2023.01) |

(52) U.S. Cl.
CPC ............ *B25J 9/162* (2013.01); *B25J 9/0084* (2013.01); *B25J 9/1694* (2013.01); *B25J 11/005* (2013.01); *B64C 39/024* (2013.01)

(58) Field of Classification Search
CPC ........ B25J 9/162; B25J 11/005; B25J 9/0084; B25J 9/1694; B25J 19/002; B25J 9/023; B64U 2101/26

USPC .......................................................... 700/247
See application file for complete search history.

(56) References Cited

U.S. PATENT DOCUMENTS

| | | | |
|---|---|---|---|
| 9,753,461 B1 | 9/2017 | Johnson et al. | |
| 2012/0143371 A1* | 6/2012 | Selnes | G05B 19/423 |
| | | | 700/254 |
| 2015/0148949 A1* | 5/2015 | Chin | B25J 13/006 |
| | | | 700/245 |
| 2015/0204480 A1 | 7/2015 | Lorimer et al. | |
| 2016/0023761 A1 | 1/2016 | McNally | |
| 2016/0236346 A1* | 8/2016 | Lee | B64U 50/19 |

(Continued)

FOREIGN PATENT DOCUMENTS

| | | |
|---|---|---|
| CN | 105375398 A | 3/2016 |
| CN | 106099748 A | 11/2016 |

(Continued)

*Primary Examiner* — Chun Cao
(74) *Attorney, Agent, or Firm* — Milligan PC LLO

(57) ABSTRACT

The present invention provides a system for use with UAVs to allow for mechanical activities at-height on elevated structures. According to a first preferred embodiment, the present invention includes multiple tool types which allow for a wide variety of mechanical activities to be performed. As discussed further herein, the present invention further includes methods for introducing mechanical pressure, similar to a person providing a scrubbing or wiping motion. Additionally, the present invention includes methods to tighten, loosen or gauge the security of hardware and a docking system which allows attachment to structures and surfaces so that opposing forces can be applied.

23 Claims, 9 Drawing Sheets

(56) References Cited

U.S. PATENT DOCUMENTS

| | | |
|---|---|---|
| 2018/0257774 A1 | 9/2018 | Volpi |
| 2019/0113922 A1* | 4/2019 | Koyama ................ B64U 20/87 |
| 2019/0127064 A1* | 5/2019 | Beardsley ........... B05B 13/0278 |
| 2019/0250642 A1* | 8/2019 | Luo ......................... B64C 27/72 |
| 2019/0321971 A1* | 10/2019 | Bosworth ............ B25J 15/0028 |
| 2020/0174478 A1 | 6/2020 | Abdellatif et al. |

FOREIGN PATENT DOCUMENTS

| | | |
|---|---|---|
| CN | 205829037 U | 12/2016 |
| CN | 107117305 A | 9/2017 |
| CN | 109625272 A | 4/2019 |
| CN | 109703744 A | 5/2019 |
| CN | 209616384 U | 11/2019 |
| EP | 2983259 A1 | 2/2016 |
| FR | 3036992 A1 | 12/2016 |
| FR | 3087271 A1 | 4/2020 |
| JP | 2017115787 A | 6/2017 |
| SI | 24941 A | 9/2016 |

* cited by examiner

SYSTEM, METHOD AND APPARATUS FOR PROVIDING A WORK PLATFORM FOR USE WITH AN UNMANNED AERIAL VEHICLE

RELATED APPLICATIONS

The present application claims priority to U.S. Provisional Application No. 63/235,223 filed Aug. 20, 2021.

BACKGROUND AND FIELD OF THE PRESENT INVENTION

Field of the Present Invention

The present invention relates generally to a system and method for providing a tool platform for an unmanned aerial vehicle (UAV). More specifically, the present invention relates to a system, method and apparatus for providing a tool platform for a UAV which allows for the performance of mechanical activities on elevated structures.

BACKGROUND OF THE INVENTION

Unmanned Aerial Vehicles (UAVs) have been increasing used to monitor and inspect structures at extended heights. For example, Publication No. WO2019160453A1 teaches the use of drone devices for monitoring the condition of electrical transmission lines. This solution includes attaching a wire to an electrical transmission line and using a sleeve that is capable of sliding along the guide. Likewise, Russian Patent No. 2558002C1 teaches using helicopter type aircraft to install a device for receiving diagnostics from an overhead power transmission line. A further example is Russian Patent No. 2421746C1 which teaches using a UAV having sensors located in its wings to measure electric field intensity from high-voltage power lines. U.S. Publ. No. US2017015415A1 also teaches a UAV which is configured to interface with utility transmission systems to draw power for the UAV.

In terms of attached devices, U.S. Publ. No. US2006114122A1 teaches an inspection device which attaches to a power line and travels down the power line using power from the power line. Similarly, U.S. Publ. No. US2016313209A1 teaches a utility pole monitoring system which includes having monitoring devices mounted to a plurality of utility tower/poles.

Each system of the prior art fails to teach or suggest a UAV platform which is capable performing meaningful work at heights such as painting, sanding, adjusting bolts and the like.

SUMMARY OF THE PRESENT INVENTION

To address the shortcomings presented in the prior art, the present invention provides a system for use with UAVs to allow for mechanical activities at-height on elevated structures.

According to a first preferred embodiment, the present invention includes multiple tool types which allow a wide variety of mechanical activities to be performed by a UAV supported platform. The present invention further includes methods for introducing mechanical pressure, similar to a person providing a scrubbing or wiping motion. Additionally, the present invention includes methods to tighten, loosen or gauge the security of hardware such as pins, nuts and bolts.

According to a further preferred embodiment, the present invention includes a docking system which allows attachment to structures and surfaces so that opposing forces can be applied. Additionally, the system of the present invention further includes center of gravity (COG) compensation structures and methods.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
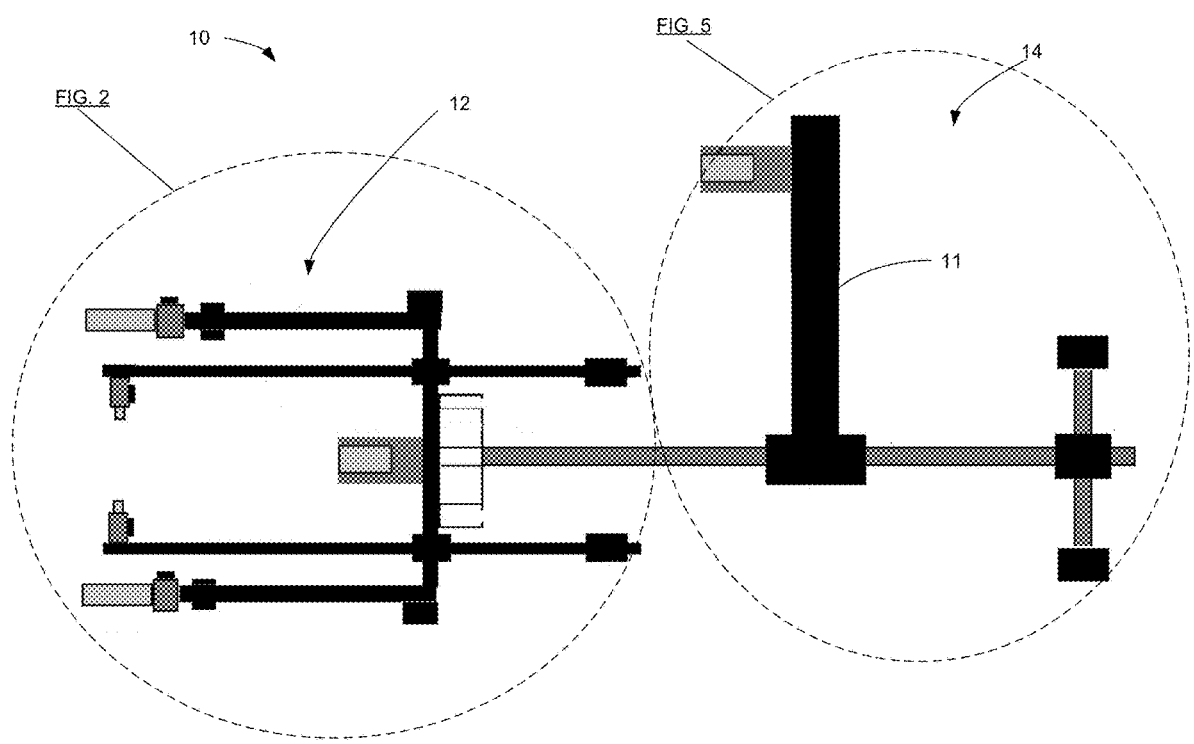
FIG. 1 shows an exemplary top down view of a tool platform in accordance with the present invention.
Figure 2:
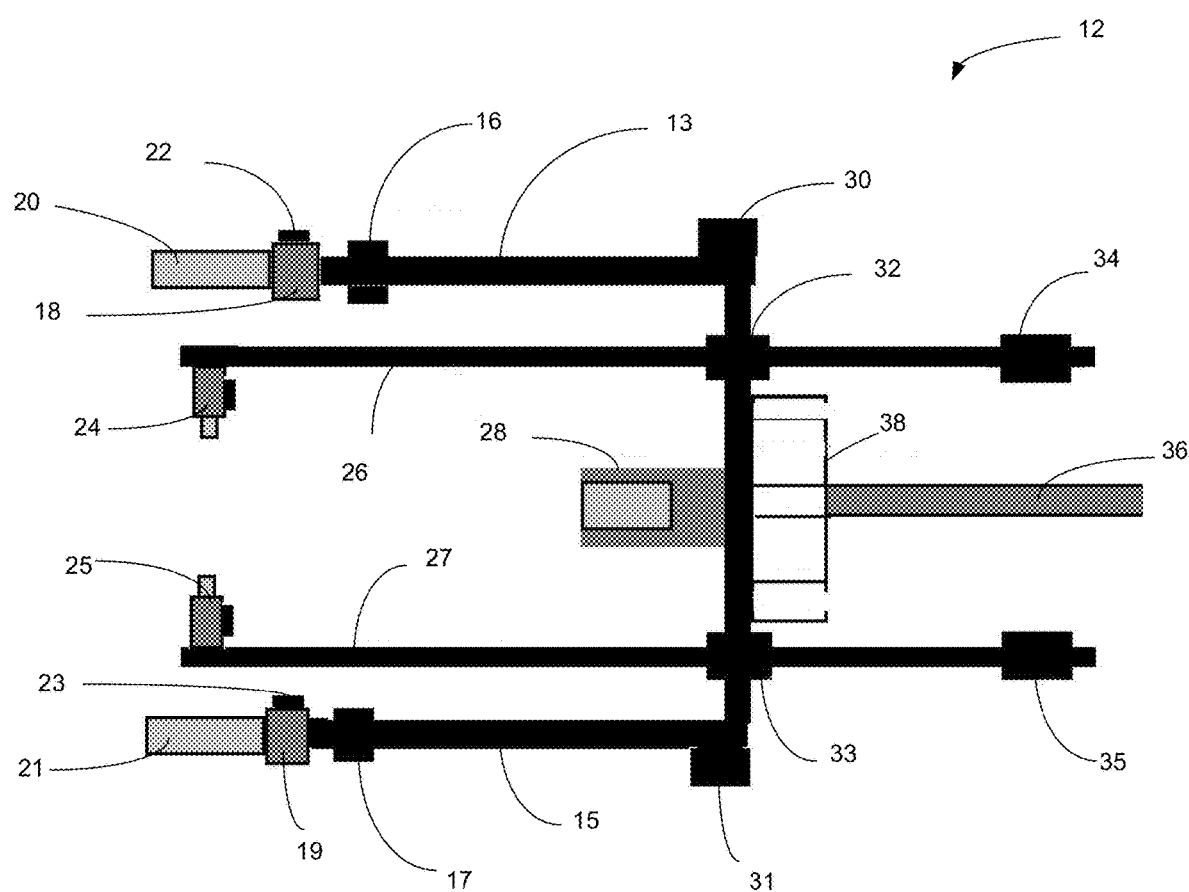
FIG. 2 shows an enlarged view of a front section of the tool platform shown in FIG. 1.
Figure 3:
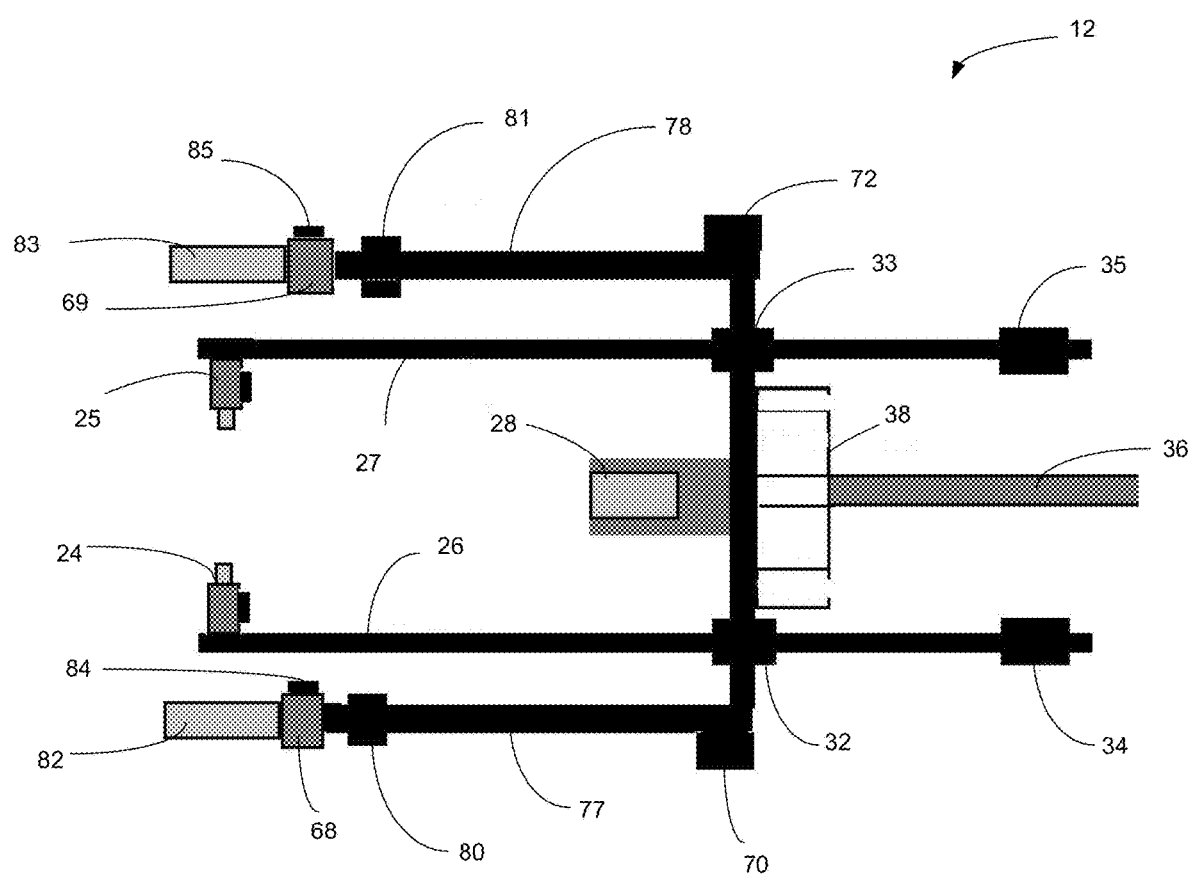
FIG. 3 shows a bottom-up view of the front section of the tool platform shown in FIG. 2.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic load library and/or other sequence of instructions designed for execution on a computer system. Memory and data storage means, as defined herein, includes many different types of computer readable media that allow a computer to read data therefrom and that maintain the data stored for the computer to be able to read the data again. Such memory and data storage means can include, for example, ROM, RAM, buffers, cache memory, and signals within network circuits.

FIGS. 1-9 illustrate examples of a tool platform 10 in accordance with preferred embodiments of the present invention. Accordingly, FIGS. 1-9 (and other examples within the present application) are intended to be illustrative and any of a variety of systems, arrangements and alternatives may be used with the present invention without limitation.

Referring now to FIG. 1, an example tool platform 10 is provided. As shown, the platform 10 includes a front section 12 and a rear section 14 which are discussed in more detail herein. Additionally, the platform 10 includes a mounting system 11 which is attachable to a UAV or drone (not shown) for transport and work. A variety of alternative mounting systems may be used with the present invention without limitation. The mounting system 11 may, for example, incorporate a remotely controlled release to allow for the remote disconnection between the drone and the tool platform 10 during emergency situations.

Figure 7:
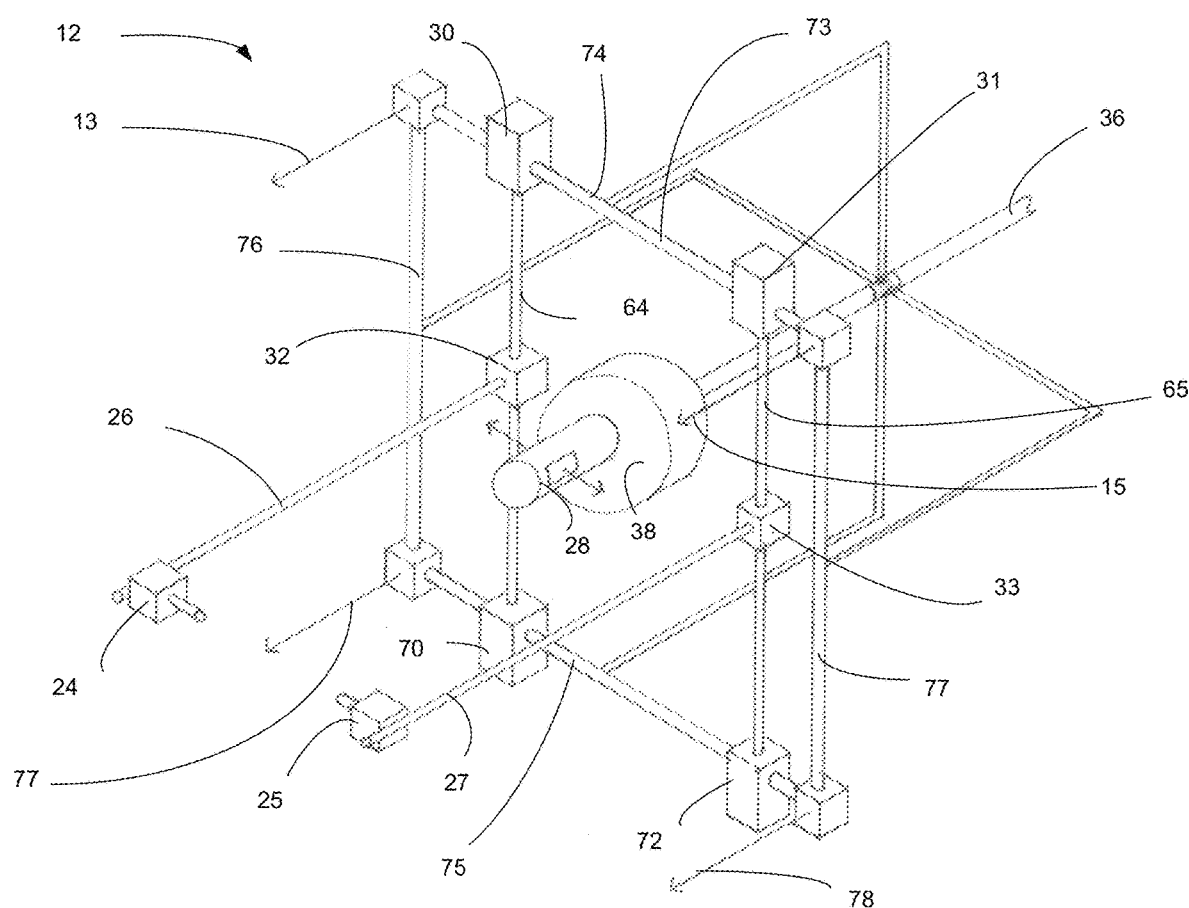
FIG. 7 shows a simplified, perspective diagram illustrating the tool platform shown in FIGS. 1-3 of the present invention.
Figure 8:
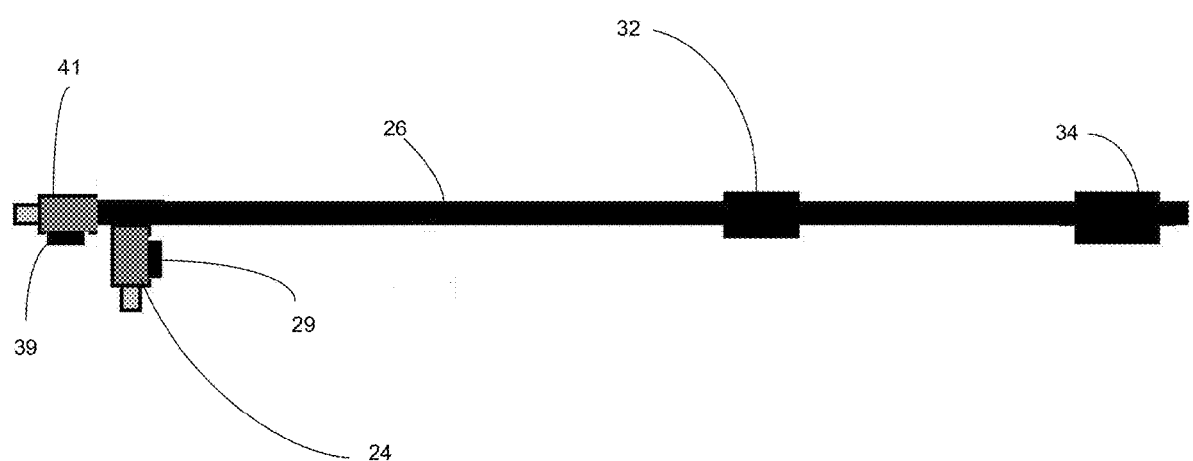
FIG. 8 shows an example tool arm shaft for use with the present invention.
Figure 9:
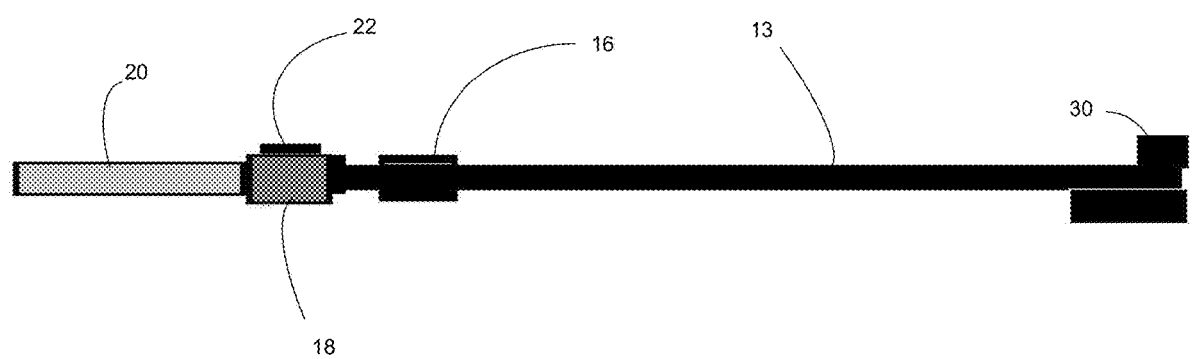
FIG. 9 shows an example latching shaft for use with the present invention.

Referring now to FIGS. 2, 3, 6 and 7, additional details of the front section 12 of the platform 10 shall now be discussed. As shown, the front section 12 includes latching systems 18, 19, 68, 69 (latching systems 68, 69 shown in FIGS. 3 and 5) which are attached respectively to latching shafts 13, 15 (lower latching shafts 77, 78 shown in FIG. 3). Preferably, the latching shafts 13, 15 are connected to each respective latching system 18, 19 via servos 16, 17. Likewise, the lower latching shafts 77, 78 are connected to respective latching systems 68, 69 via servos 80, 81. In FIG. 7, the latching shafts 13, 15, 77, 78 are indicated by simplified line segments and the details of the latching systems 18, 19, 68, 69 (including servos, sensors and latching devices discussed below) are not shown. FIG. 8 shows an enlarged view of an example tool arm shaft 26 for use with the present invention. FIG. 9 shows an enlarged view of an example latching shaft 13 for use with the present invention.

Preferably, the servos 16, 17, 80, 81 may be 3-axis servos or the like. Preferably, the latching systems 18, 19, 68, 69 may be mechanically linked to each respective servo 16, 17, 80, 81. Additionally, each latching system 18, 19, 68, 69 and servo 16, 17, 80, 81 are preferably electrically connected to the power and control assembly 38 as discussed further below. Preferably, the latching systems 18, 19, 68, 69 of the present invention may accept different latching devices 20, 21, 82, 83 such as vacuums, clamps, magnetic, piezoelectric and the like. The latching servos 16, 17, 80, 81 preferably allow each respective latching system/device 20, 21, 82, 83 of the present invention to rotate, pan and/or tilt in response to instructions from the control system 38 as discussed below.

Referring again to FIGS. 2, 3 and 6, one or more of the latching shafts 13, 15, 77, 78 may attach to and support a visual positioning sensor 22, 23. Lower latching shafts 77, 78 likewise may support respective visual positioning sensors 84, 85. Preferably, each visual positioning sensor 22, 23, 84, 85 may provide visual data to the control system 38 to allow either an unmanned vehicle pilot or computer system to ascertain the position of the latching system relative to the intended target. Preferably, each visual positioning sensor 22, 23, 84, 85 may include sensors such as: sonar, millimeter wave, magnetic, RF, ultraviolet, laser scanners, CT scanners, laser tracking scanners, IR, white light scanners and/or near/short/long wave infrared sensor devices. Additionally, each visual positioning sensor 22, 23, 84, 85 may be augmented by supplementary emitting devices such as infrared lasers or illuminators in the visible, ultraviolet or infrared spectrums.

With reference now to FIGS. 2, 3, 6 and 7, the latching system of the present invention is preferably supported by a positioning assembly frame 73 which preferably includes an upper positioning shaft 74 and a lower positioning shaft 75 which are each preferably horizontally aligned and parallel to each other. The positioning assembly 73 preferably also includes a right positioning shaft 76 and a left positioning shaft 77. One or more vertical tool arm positioning shafts 64, 65 preferably extend between the upper and lower positioning shafts 74, 75. The tool arm positioning shafts 64, 65 are preferably attached at each end to respective servo motors 30, 31, 70, 72 which allow the positioning shafts 64, 65 to be moved left and right (i.e., along the x-axis) based on command signals provided by the controller 38. In this way, the system preferably controls and positions the attached tool arm shafts 26, 27 along the x-axis.

As further shown in FIGS. 2, 3, 6 and 7, each tool arm shaft 26, 27 is preferably mechanically linked to at least one yz-axis servo motor 32, 33 which is arranged to move each tool arm shaft 26, 27 along each respective tool arm positioning shafts 64, 65 (i.e., up and down along the y-axis). Additionally, each yz-axis servo motor 32, 33 may preferably be arranged to also move each tool arm shaft 26, 27 perpendicular to the main axis of the positioning assembly 73 (i.e., in and out along the z-axis). As discussed further below, each tool arm shaft 26, 27 preferably supports a vertical tool 24, 25 and preferably further includes a weighted counter-balance 34, 35 (not shown in FIG. 7).

As shown in FIG. 8, each tool arm shaft 26 of the present invention may preferably support horizontally aligned tools 24 and/or vertically aligned tools 41, as well as any other variation of tool alignments and configurations. In operation, the tool arm shafts 26, 27 preferably mechanically mate with their respective servos 32, 33 to provide propulsion and positioning of the tool arm shafts 26, 27. Each tool arm shaft 26, 27 may be connected to a variety of tools 24, 25, 41 such as by using a mating socket, bayonet type mechanism, a combination of channels and magnets, latches and/or through other mounting hardware such as threaded nuts and bolts. Each tool 24, 25, 41 may further each include co-located vision/position/distance sensors 29, 39.

According to preferred embodiments, the positioning shafts 74, 75, 76, 77 of the positioning assembly 73 preferably are formed to include channels and mating gears to the servos to allow for movement of the respective shaft components and attached tool arms. Further, each positioning shaft 74, 75, 76, 77 may include either a smooth, notched or threaded rod (worm drive) to provide mechanical interaction within each moving servo. Accordingly, the propulsion provided by each servo may include friction, gears to match notching or threading of the tool arm positioning shaft.

Figure 5:
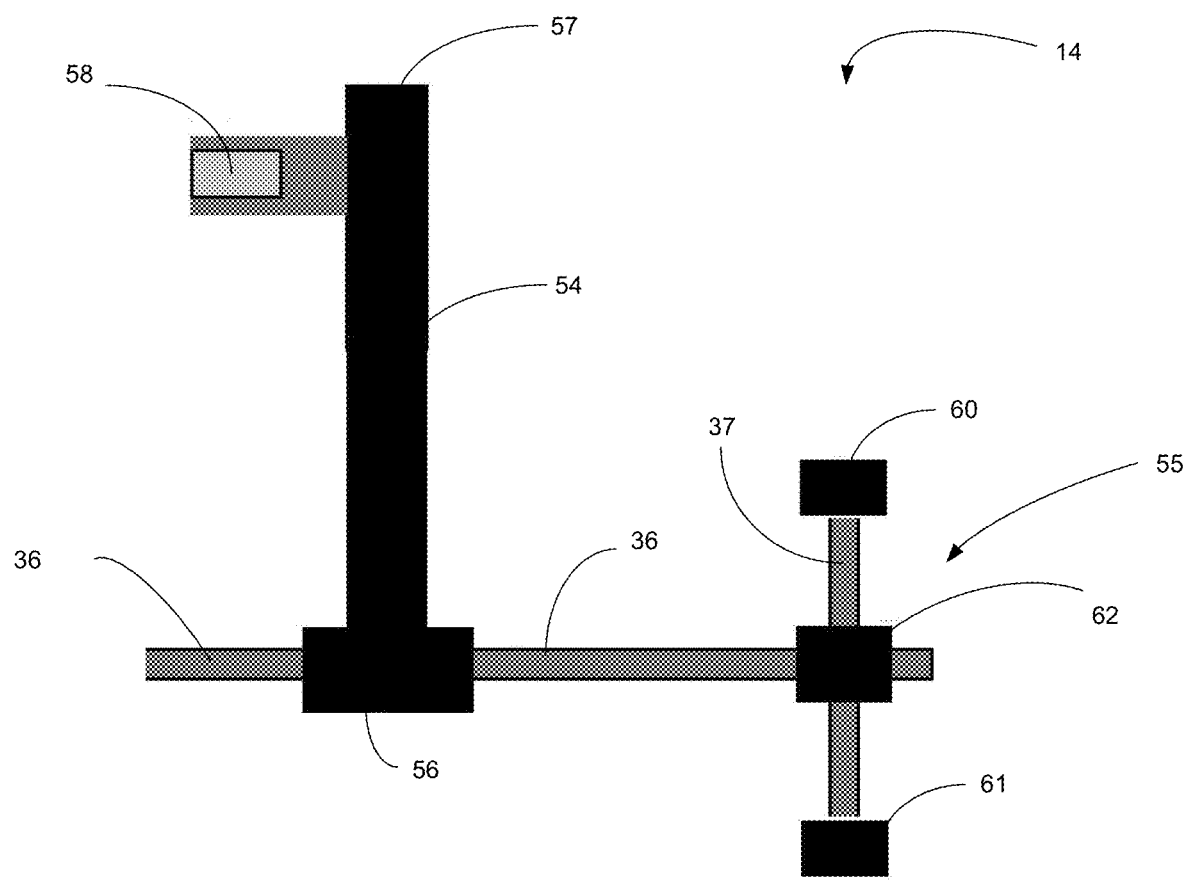
FIG. 5 shows an enlarged view of a rear section of the tool platform shown in FIG. 1.
Figure 6:
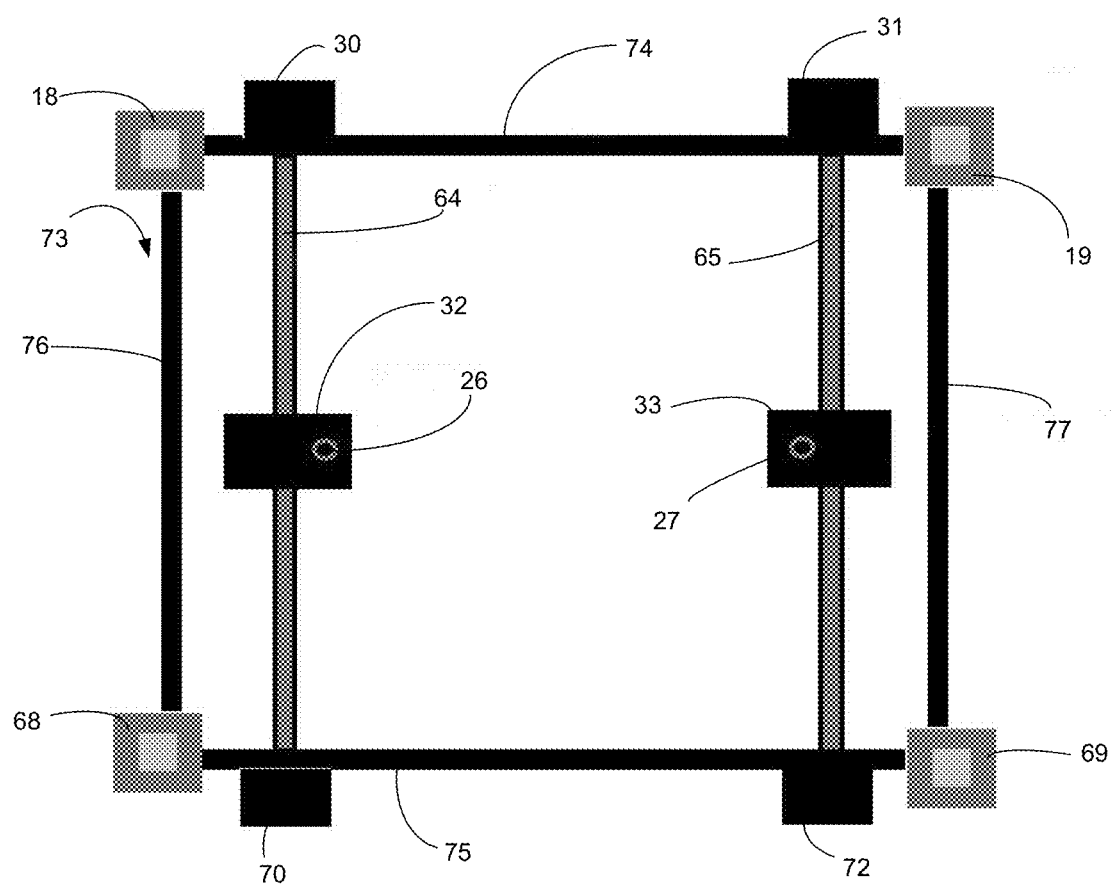
FIG. 6 shows a front view of the exemplary tool platform shown in FIGS. 1-3.

With reference now to FIG. 5, an enlarged view of a rear section 14 of the tool platform 10 shown in FIG. 1 shall now be discussed. As shown, the rear section 14 may preferably extend from the central horizontal positional shaft 36. The rear section 14 may preferably also include an attachment shaft 54 which preferably provides an attachment point 57 to allow the tool platform 10 to attached to a UAV or similar device. As shown, the attachment shaft 54 preferably includes a sensor 58 to assist with UAV docking and other tool platform 10 movements. The location of the attachment shaft 54 along the positional shaft 36 may preferably be adjusted via a positional servo 56 or the like.

The positional shaft 36 preferably extends further to a tail section 55 which preferably includes a center-of-gravity (COG) compensator vertical positioning servos 60, 61. The tail section 55 preferably also includes a COG compensator horizontal positioning servo 62. Both sets of servos 60, 61, 62 preferably provide geared, threaded and/or friction based propulsion to propel itself along respective positional shafts 36, 37. Each servo 60, 61, 62 preferably further include storage for high density weights to increase or decrease the moment.

According to a preferred embodiment, the components of the tool platform 10 (both front and rear sections) may be formed of carbon fiber or other light-weight material. According to a further preferred embodiment, the various shafts and assemblies of the tool platform 10 may be a fixed length or may be retractable to vary their lengths during transport and/or mechanical work.

Figure 4:
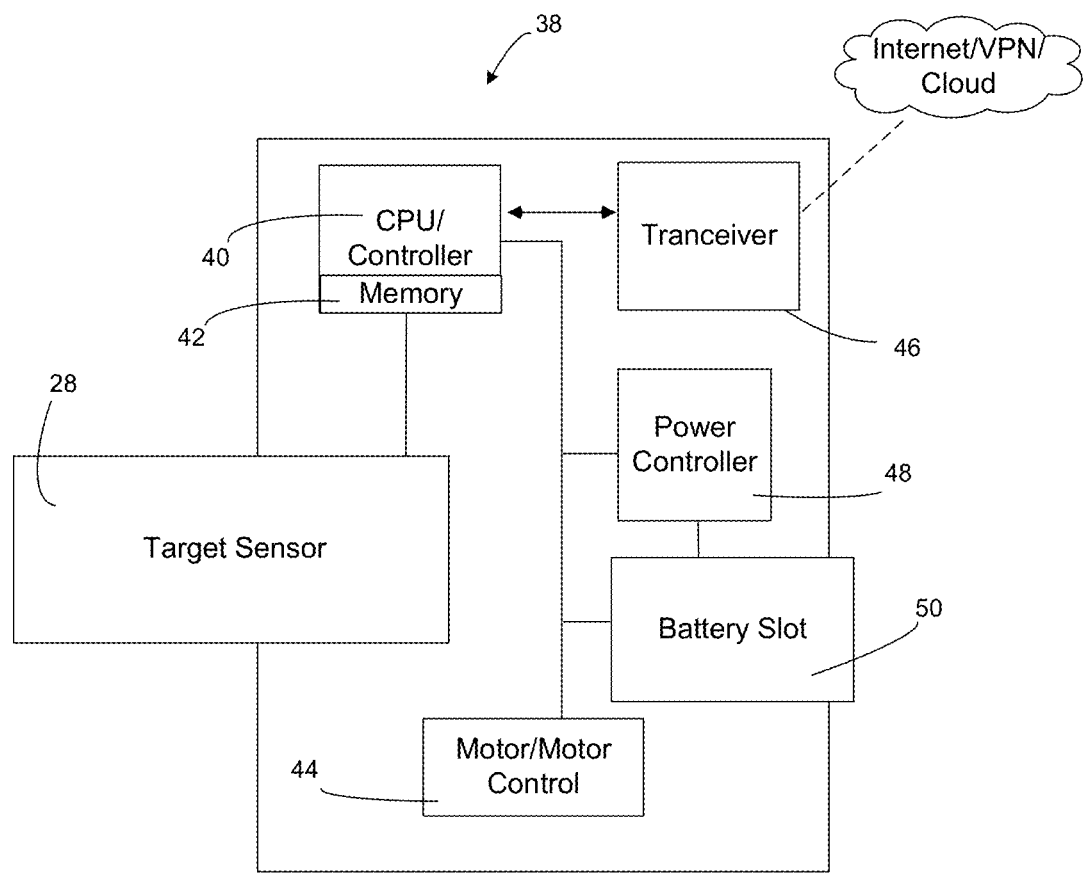
FIG. 4 shows a block diagram illustrating an exemplary processing architecture of the tool platform in accordance with a first preferred embodiment of the present invention.

Referring now to FIG. 4, the controller 38 of the present invention may include a variety of components including a CPU/controller module 40, a memory 42, a motor controller 44, a transceiver 46, a power controller 48 and a battery slot 50 (or internal battery). Preferably, the memory 42 allows for recording of telemetry data, sensory data to include dimensional scans, gauge readings from tools and/or visual data obtained from positioning sensors. Additional stored information may preferably be received via the transceiver 46, a physical connection via serial power, and/or a removable media device or the like. The power controller 48 preferably monitors battery power levels, current demand of connected electronics and provides data to and interruptions by the CPU/controller 40. The CPU/controller module 40 preferably interrupts data received from sensory items, tools, position servo data, inertia measurement units, the power controller 48, and commands received via the transceiver 42. The CPU/controller module 40 preferably further provides commands to the power controller 48 to provide the flow or interruption of power to various components of the present invention. Additionally, the power controller 48 preferably provides electronic speed control (ESC) as needed for connected servos.

Preferably, the battery slot 50 may allow for both removable and affixed rechargeable batteries or provisions to accept external power. Although the components of the controller 38 are shown in a common housing, these components may alternatively be distributed at other locations within the platform 10 without departing from the scope of the present invention The CPU/controller 40 preferably provides processing functionality for the systems of the platform 10 and may include any number of processors, micro-controllers, or other processing systems to execute one or more software programs that implement techniques described herein. The CPU/controller 40 preferably receives data from one or more sensors including the target sensor 28 as discussed above. In operation, the target sensor 28 is preferably used to scan the overall operation of the tool arms and latching systems, and to provide three-dimensional awareness data to the power and control systems within the controller 38. Such three-dimensional data can be accomplished through LiDAR, sonar, millimeter wave, an array of stereoscopic cameras or the like.

According to an alternative preferred embodiment, the platform 10 may also selectively rely on the power and control systems within an attached UAV during transport instead of using independent power and control. The controller 38 may further receive data from a variety of other sensor types beyond the sensors discussed herein. These may include additional devices such as an inertial measurement unit (i.e., accelerometer) and flight controller to stabilize movement of the shaft/arm during transport and on-site. Additionally, the tool platform 10 may include onboard lighting to assist with gathering image data.

The transceiver 46 may preferably transmit and receive using any wired or wireless protocols for communicating between elements, including for instance: Wi-Fi, 3G, 4G, CDMA, TDMA, OSM, Ethernet, Bluetooth, Zigbee, MIMO and/or any other standards based on proprietary protocols capable of transmitting data.

While the above descriptions regarding the present invention contain much specificity, these should not be construed as limitations on the scope, but rather as examples. Many other variations are possible. For example, the processing elements of the present invention may operate on a number of frequencies. Further, the communications provided with the present invention may be designed to be duplex or simplex in nature. Further, as needs require, the processes for transmitting data to and from the present invention may be designed to be push or pull in nature. Still, further, each feature of the present invention may be made to be remotely activated and accessed from distant monitoring stations such as computer, tablet or smart phone. Accordingly, data may preferably be uploaded to and downloaded from the present invention as needed.

Accordingly, the scope of the present invention should be determined not by the embodiments illustrated, but by the appended claims and their legal equivalents.

What is claimed is:

1. A tool platform for use with an unmanned aerial vehicle (UAV), wherein the tool platform comprises:
   a positioning frame assembly; wherein the positioning frame assembly comprises:
      an upper positioning shaft;
      a lower positioning shaft; wherein the upper positioning shaft and the lower positioning shaft are horizontally aligned and parallel to each other;
      a right positioning shaft; and
      a left positioning shaft; wherein the right positioning shaft and the left positioning shaft are vertically aligned and parallel to each other;
   a first and second vertical tool arm positioning shafts;
      wherein the first and second vertical tool arm positioning shafts extend between the upper and lower positioning shafts; wherein the first and second vertical tool arm positioning shafts are attached respectively to a first pair of servo motors and a second pair of servo motors; wherein the first pair of servo motors are configured to move the first vertical tool arm positioning shaft between the right positioning shaft and the left positioning shaft; wherein the second pair of servo motors are configured to move the second vertical tool arm positioning shaft between the right positioning shaft and the left positioning shaft;
   a first tool arm shaft;
   a second tool arm shaft;
   a first yz-axis servo motor; wherein the first yz-axis servo motor is configured to move the first tool arm shaft along the first tool arm positioning shaft;
   a second yz-axis servo motor; wherein the second yz-axis servo motor is configured to move the second tool arm shaft along the second tool arm positioning shaft;
      wherein the first yz-axis servo motor is configured to move the first tool arm shaft perpendicular to a main axis of the positioning assembly;
      wherein the second yz-axis servo motor is configured to move the second tool arm shaft perpendicular to the main axis of the positioning assembly;
   a first tool; wherein the first tool is attached to the first tool arm shaft;
   a second tool; wherein the second tool is attached to the second tool arm shaft;

a first counter-balance; wherein the first counter-balance is attached to the first tool arm shaft;

a second counter-balance; wherein the second counter-balance is attached to the second tool arm shaft;

a central positioning shaft;

a tail section; wherein the tail section comprises:
   a center-of-gravity compensator vertical positioning servo, and
   a center-of-gravity compensator horizontal positioning servo;
and a controller, wherein the controller comprises:
   a controller module;
   a transceiver;
   a target sensor;
   a motor controller; and
   a battery module.

2. The tool platform of claim 1, wherein the tool platform further comprises a mounting system which is configured to attach to an unmanned aerial vehicle (UAV).

3. The tool platform of claim 2, wherein the tool platform further comprises a remotely controlled release to allow for remotely disconnection between the UAV and the tool platform.

4. The tool platform of claim 3, wherein the tool platform further comprises a plurality of latching shafts; wherein each of the plurality of latching shafts comprise:
   a latching shaft servo motor; wherein the latching shaft servo motor is configured to move the latching shaft; and
   a latching system; wherein the latching system is configured to connect to a latching device;
   wherein the latching devices are selected from the group of latching devices comprising:
   vacuums, hooks, clamps, and magnets.

5. The tool platform of claim 4, wherein each latching system is connected to each respective latching shaft via one or more latching servo motors.

6. The tool platform of claim 5, wherein the latching servo motors are 3-axis servo motors.

7. The tool platform of claim 6, wherein the latching servo motors are configured to allow each respective latching device to rotate, pan and tilt in response to instructions from the controller.

8. The tool platform of claim 7, wherein at least one latching system comprises a positioning sensor.

9. The tool platform of claim 8, wherein the positioning sensor comprises a visual positioning sensor; wherein the visual positioning sensor is configured to provide visual data to the control system.

10. The tool platform of claim 9, wherein the visual positioning sensor comprises a sensor selected from the group of sensors comprising: sonar, millimeter wave, magnetic, RF, ultraviolet, laser scanners, CT scanners, laser tracking scanners, IR, white light scanners, and infrared sensor devices.

11. The tool platform of claim 10, wherein the first tool is selected from a first group of tools; wherein the first group of tools comprises: a mating socket, bayonet type mechanism, a combination of channels and magnets, latches, mounting hardware, threaded nuts and bolts.

12. The tool platform of claim 11, wherein the second tool is selected from a second group of tools; wherein the second group of tools comprise: a mating socket, bayonet type mechanism, a combination of channels and magnets, latches, mounting hardware, threaded nuts and bolts.

13. The tool platform of claim 12, wherein the component positioning shafts of the positioning frame assembly are comprised of channels and mating gears.

14. The tool platform of claim 13, wherein the component positioning shafts of the positioning frame assembly are comprised of threaded rods.

15. The tool platform of claim 14, wherein the first tool is horizontally aligned with the first tool arm shaft.

16. The tool platform of claim 15, wherein the second tool is horizontally aligned with the second tool arm shaft.

17. The tool platform of claim 16, wherein the tail section extends from the central positioning shaft; wherein the tail section comprises an attachment shaft; wherein the attachment shaft terminates in the mounting system.

18. The tool platform of claim 17, wherein the tool platform further comprises a positional servo motor; wherein the positional servo motor is configured to move the location of the attachment shaft along the central positional shaft.

19. The tool platform of claim 18, wherein the controller is configured to process target sensor data; wherein the target sensor data comprises: telemetry data, sensory data, dimensional scans, gauge readings from tools and visual data obtained from positioning sensors.

20. The tool platform of claim 19, wherein the controller is configured to process target sensor data to generate three-dimensional location data.

21. The tool platform of claim 20, wherein the three-dimensional location data is generated at least in part based on data generated by: LiDAR, sonar, millimeter wave, or stereoscopic cameras.

22. The tool platform of claim 21, wherein the platform is configured to receive power from an attached UAV during transport.

23. The tool platform of claim 22, wherein the controller is configured to receive data from a UAV flight controller during flight.

* * * * *